United States Patent
Amanuma et al.

(10) Patent No.: US 6,536,572 B2
(45) Date of Patent: Mar. 25, 2003

(54) SYNCHRONIZING SYSTEM AND TRANSMISSION TORQUE CONTROL DEVICE THEREFOR

(75) Inventors: Hirokatsu Amanuma, Saitama-ken (JP); Naoki Uchiyama, Saitama-ken (JP); Hidenori Okamura, Saitama-ken (JP); Kenji Honda, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/956,929

(22) Filed: Sep. 21, 2001

(65) Prior Publication Data

US 2002/0036128 A1 Mar. 28, 2002

(30) Foreign Application Priority Data

Sep. 26, 2000 (JP) .......................................... 2000-291571

(51) Int. Cl.$^7$ ............................................... F16D 23/06
(52) U.S. Cl. ................................. 192/53.32; 192/53.34
(58) Field of Search ............................ 192/53.32, 53.34, 192/18 R; 74/339

(56) References Cited

U.S. PATENT DOCUMENTS

| | | | |
|---|---|---|---|
| 4,566,569 A | * 1/1986 | Eriksson | 192/53.361 |
| 4,830,159 A | * 5/1989 | Johnson et al. | 192/53.32 |
| 5,462,148 A | * 10/1995 | Azuma et al. | 192/48.3 |
| 5,975,263 A | * 11/1999 | Forsyth | 192/53.32 |

* cited by examiner

Primary Examiner—Saul Rodriguez
(74) Attorney, Agent, or Firm—Armstrong, Westerman & Hattori, LLP

(57) ABSTRACT

There are provided a synchronizing system which synchronizes two relatively rotating rotary bodies with each other by frictional forces generated between friction discs, such that a larger torque can be transmitted between the rotary bodies as an input torque becomes larger, and a transmission torque control device for the synchronizing system. In order to transmit torque between an input shaft and a gear member, the synchronizing system which connects the input shaft and the gear member with each other while synchronizing them urges a blocking ring toward the gear member by using a synchronizing spring, when a sleeve is caused to slide toward the blocking ring by an actuator. This starts synchronization of the input shaft and the gear member via friction discs rotating together with the blocking ring and friction discs rotating together with the gear member, and brings the tooth ends of the splines of the sleeve and the tooth ends of the splines of the blocking ring into abutment with each other, whereby the input shaft and the gear member are mechanically connected to each other.

6 Claims, 5 Drawing Sheets

SYNCHRONIZING SYSTEM AND TRANSMISSION TORQUE CONTROL DEVICE THEREFOR

BACKGROUND OF THE INVENTION

1. Field of the Invention

This invention relates to a synchronizing system for connecting two rotary bodies arranged in a manner spaced from each other and at the same time relatively rotatable about an identical axis while synchronizing the two rotary bodies with each other, so as to transmit torque between the two rotary bodies, and a transmission torque control device for controlling the torque transmitted between the two rotary bodies by the synchronizing system.

2. Description of the Prior Art

Conventionally, a synchronizing system of this kind has been proposed e.g. in Japanese Laid-Open Patent Publication (Kohyo) No. 11-501104, which is applied to a transmission for an automotive vehicle, and executes a synchronizing operation for synchronizing a transmission shaft and a transmission gear coaxial with the transmission shaft when they are relatively rotating. This synchronizing system includes a synchronizing body rotating together with the transmission shaft, and a sleeve which rotates together with the synchronizing body and is capable of sliding along the axis with respect to the synchronizing body. Further, the sleeve is comprised of two inner and outer disc holders, a multiple disc clutch which is disposed between the two disc holders and formed by a lot of friction discs connected to the outer disc holder and a lot of friction discs connected to the inner disc holder, which are arranged alternately in the axial direction to have a comb teeth-like shape as a whole, and a disc spring for always urging the above friction discs in the axial direction. During the synchronizing operation, when the sleeve is pressed toward the transmission gear by a gear switching device to cause the outer disc holder of the sleeve to mesh with the transmission gear, and at the same time the inner disc holder is urged toward the transmission gear by the gear switching device to urge the lot of friction discs toward the transmission gear via the disc spring, whereby the large number of friction discs are brought into abutment with each other. The abutment of the friction discs generates frictional forces, whereby synchronization of the transmission gear and the transmission shaft is started, and torque is transmitted between the transmission gear and the transmission shaft.

According to the above conventional synchronizing system, the synchronizing operation for synchronizing the transmission gear and the transmission shaft is carried out by the urging force of the disc spring, so that the torque transmitted between the transmission gear and the transmission shaft during the synchronizing operation is limited to a value equal to or smaller than a limit value determined by the urging force of the disc spring. As a result, the conventional synchronizing system suffers from the problem that when an input torque is larger than the limit value, the torque can be transmitted only in a range within the limit value.

SUMMARY OF THE INVENTION

It is an object of the invention to provide a synchronizing system which synchronizes two relatively rotating rotary bodies with each other by frictional forces generated between friction discs, such that a larger torque can be transmitted between the rotary bodies as an input torque becomes larger, and a transmission torque control device for the synchronizing system.

To attain the above object, according to a first aspect of the invention, there is provided a synchronizing system for connecting a first rotary body and a second rotary body arranged in a manner spaced from each other and at the same time relatively rotatable about an identical axis, while synchronizing the first rotary body and the second rotary body with each other so as to transmit torque between the first rotary body and the second rotary body.

The synchronizing system according to the first aspect of the invention is characterized by comprising:

an engagement member which is arranged between the first rotary body and the second rotary body in a manner such that the engagement member is capable of moving along the axis and rotating about the axis relatively with respect to each of the first rotary body and the second rotary body;

at least one first friction disc rotating together with the first rotary body;

at least one second friction disc each arranged in a manner opposed to and spaced from the at least one first friction disc, the at least one second friction disc rotating together with the engagement member, and being brought into surface contact with the at least one first friction disc when the engagement member is urged toward the first rotary body, thereby synchronizing the engagement member and the first rotary body with each other;

a movable member which rotates together with the second rotary body and is capable of moving along the axis with respect to the second rotary body such that the movable member can move to a disconnected position in which the movable member is spaced from the engagement member, a synchronizing position in which the movable member is capable of abutting against the engagement member from an opposite side to the first rotary body, and a connected position in which the movable member is engaged with the first rotary body; and a synchronizing member which, when the movable member moves from the disconnected position to the synchronizing position, is driven by the movable member to thereby urge the engagement member toward the first rotary body, whereby the synchronizing member starts to synchronize the first rotary body and the second rotary body via the at least one first friction disc and the at least one second friction disc and causes the engagement member to abut against the movable member located in the synchronizing position.

According to this synchronizing system, the first rotary body and the second rotary body are connected or linked to each other in a state in which the movable member is in a connected position in which the same is engaged with the first rotary body, and disconnected or released from each other in a state in which the movable member is in a disconnected position in which the same is spaced from the engagement member. Further, when the movable member moves from the disconnected position to the synchronizing position, the synchronizing member is driven by the movable member to thereby urge the engagement member toward the first rotary body, whereby the first rotary body and the second rotary body start to be synchronized via the at least one first friction disc and the at least one second friction disc, and the engagement member is brought into abutment with the movable member located in the synchronizing position to be urged by the movable member. In this state, the first rotary body and the second rotary body are mechanically connected to each other via the movable member, the engagement member, the at least one first friction disc and the at least one second friction disc. As a result, the torque transmitted between the first rotary body and the second rotary body is increased since as the urging force of the movable member applied to the engagement member is increased, frictional forces generated between the at least one first friction disc and the at least one second friction disc are increased. Therefore, differently from the conventional synchronizing system in which torque to be transmitted is limited to a value within a limit value determined by the urging force of a disc spring, the urging force of the movable member applied to the engagement member is made larger during the synchronizing operation for synchronizing the first rotary body with the second rotary body even when the input torque is large, whereby a larger torque dependent on the increased urging force can be transmitted between the first and second rotary bodies. Further, through the control of the urging force of the movable member applied to the engagement member, it becomes possible to control the torque transmitted between the first and second rotary bodies.

Preferably, the second rotary body comprises a drive shaft, and a hub rotating together with the drive shaft.

More preferably, the first rotary body has first splines formed in an outer peripheral surface thereof, the engagement member having second splines formed in an outer peripheral surface thereof, the hub having third splines formed in an outer peripheral surface thereof, the movable member having fourth splines formed in an inner peripheral surface thereof for being in engagement with the third splines of the hub, and the fourth splines of the movable member are in abutment with the second splines of the engagement member when the movable member is in the synchronizing position, and in engagement with the second splines of the engagement member and the first splines of the first rotary body when the movable member is the connected position.

Further preferably, the first rotary body has a large-diameter portion and a small-diameter portion, the first splines of the first rotary body being formed in an outer peripheral surface of the large-diameter portion, the small-diameter portion having fifth splines formed in an outer peripheral surface thereof, the at least one first friction disc each having sixth splines formed in an inner peripheral surface thereof, and the fifth splines of the small-diameter portion of the first rotary disc are in engagement with the sixth splines of the at least one first friction disc.

Still more preferably, the engagement member has seventh splines formed in an inner peripheral surface thereof, the at least one second friction disc each having eighth splines formed in an outer peripheral surface thereof, and the seventh splines of the engagement member are in engagement with the eighth splines of the at least one second friction disc.

To attain the above object, according to a second aspect of the invention, there is provided a transmission torque control device for a synchronizing system for connecting a first rotary body and a second rotary body arranged in a manner spaced from each other and at the same time relatively rotatable about an identical axis, while synchronizing the first rotary body and the second rotary body with each other so as to transmit torque between the first rotary body and the second rotary body, the synchronizing system including an engagement member which is arranged between the first rotary body and the second rotary body in a manner such that the engagement member is capable of moving along the axis and rotating about the axis relatively with respect to each of the first rotary body and the second rotary body, at least one first friction disc rotating together with the first rotary body, at least one second friction disc each arranged in a manner opposed to and spaced from the at least one first friction disc, the at least one second friction disc rotating together with the engagement member, and being brought into surface contact with the at least one first friction disc when the engagement member is urged toward the first rotary body, thereby synchronizing the engagement member and the first rotary body with each other, a movable member which rotates together with the second rotary body and is capable of moving along the axis with respect to the second rotary body such that the movable member can move to a disconnected position in which the movable member is spaced from the engagement member, a synchronizing position in which the movable member is capable of abutting against the engagement member from an opposite side to the first rotary body, and a connected position in which the movable member is engaged with the first rotary body, and a synchronizing member which, when the movable member moves from the disconnected position to the synchronizing position, is driven by the movable member to thereby urge the engagement member toward the first rotary body, whereby the synchronizing member starts to synchronize the first rotary body and the second rotary body via the at least one first friction disc and the at least one second friction disc and causes the engagement member to abut against the movable member located in the synchronizing position, wherein the transmission torque control device controls the torque transmitted between the first rotary body and the second rotary body.

The transmission torque control device according to the second aspect of the invention is characterized by comprising:

driving means for driving the movable member along the axis;

torque detection means for detecting torque of at least one of the first rotary body and the second rotary body; and driving force setting means for setting a driving force of the driving means applied when the movable member is in abutment with the engagement member, based on the detected torque.

According to this transmission torque control device, the driving force of the movable member driven by the driving means is set based on the detected torque of at least one of the first rotary body and the second rotary body, and the movable member urges the engagement member with an urging force corresponding to the driving force set or determined. As described hereinabove, in this synchronizing system, the torque transmitted between the first rotary body and the second rotary body during a synchronizing operation depends on the urging force of the movable member applied to the engagement member. Hence, according to the transmission torque control device configured as above, the transmission torque transmitted during the synchronizing operation can be properly controlled depending on the input torque and the difference between the input torque and the output torque.

The above and other objects, features, and advantages of the invention will become more apparent from the following detailed description taken in conjunction with the accompanying drawings.

DETAILED DESCRIPTION OF A PREFERRED EMBODIMENT

Figure 1:
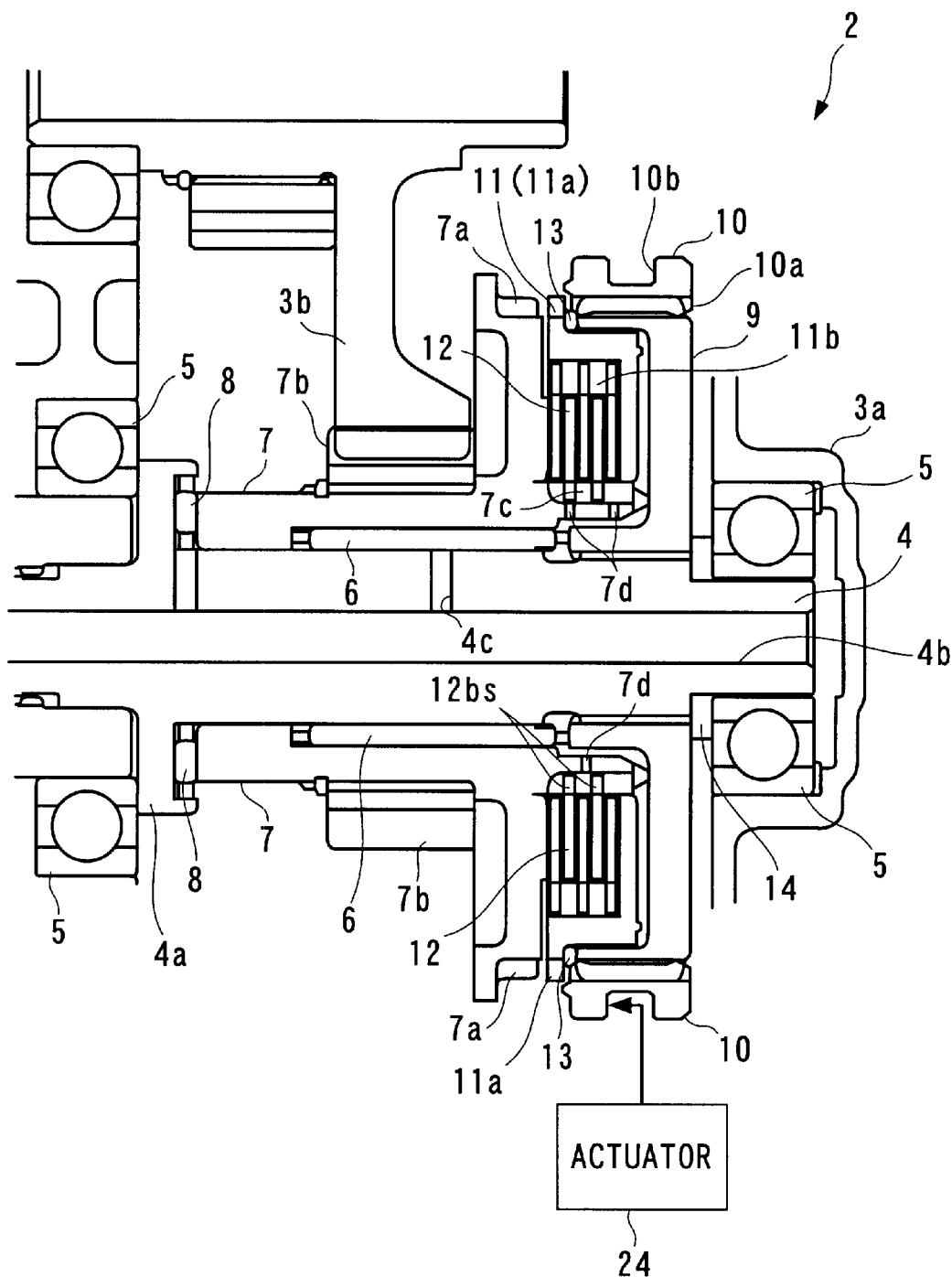
FIG. 1 is a sectional view schematically showing the arrangement of a synchronizing system to which is applied a transmission torque control device according to an embodiment of the invention.

The invention will now be described in detail with reference to the drawings showing a preferred embodiment thereof. Referring first to FIG. 1, there is schematically shown the arrangement of a synchronizing system according to an embodiment of the invention. The synchronizing system 2, which is applied to a transmission 3 (see FIG. 5) for an automotive vehicle, not shown, connects an input shaft 4 and a gear member 7, both referred to hereinafter to each other while synchronizing them with each other, and disconnects them from each other. It should be noted that in the following description, a left-hand side and a right-hand side in FIG. 1 are referred to as "left" and "right" respectively.

Figure 3A:
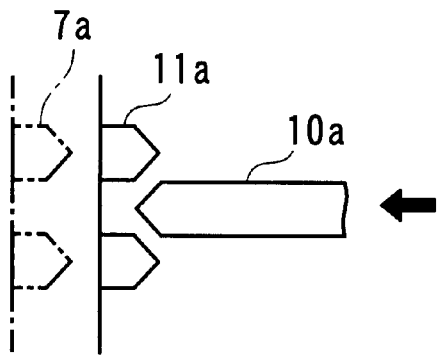
FIG. 3A is a diagram which is useful in explaining operations of a sleeve and a blocking ring of the synchronizing system immediately after the start of the synchronization.
Figure 3B:
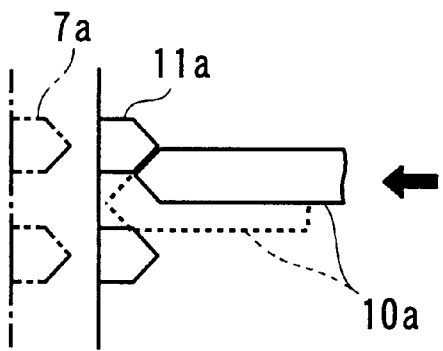
FIG. 3B is a diagram which is useful in explaining operations of the sleeve and the blocking ring during the synchronization.
Figure 3C:
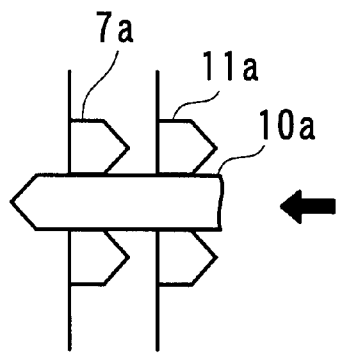
FIG. 3C is a diagram which is useful in explaining operations of the sleeve and the blocking ring after the completion of the synchronization.

As shown in the figure, the transmission 3 has a casing 3a having the input shaft 4 (second rotary body) arranged therein. This input shaft 4 is rotatably supported by left and right radial ball bearings 5, 5 and other associated components such that the same cannot be moved in the leftward and rightward directions. The input shaft 4 has the gear member 7 mounted thereon via a needle roller bearing 6 in a manner relatively rotatable with respect to the input shaft 4. The gear member 7 (first rotary body) is in abutment with a thrust bearing 8 attached to a flange portion 4a of the input shaft 4 from the right, whereby the gear member 7 is restricted such that it cannot move leftward. The gear member 7 is comprised of a hollow cylindrical small-diameter portion and a flanged large-diameter portion. The large-diameter portion has an outer peripheral surface formed with splines 7a along the axis of the input shaft 4 (hereinafter simply referred to as "the axis"). The splines 7a each have a tooth (protruding portion) having a right end portion thereof, that is, a tooth axial end portion formed with two sloped portions such that the spline 7a is tapered in the rightward direction (see FIGS. 3A to 3C). Splines 10a of a sleeve 10, referred to hereinafter, can be meshed with the splines 7a. Further, the small-diameter portion has a central portion which has an outer peripheral surface thereof formed with gear teeth 7b for meshing with a transmission gear 3b, and a right end portion which has an outer peripheral surface thereof formed with splines 7c along the axis. Further, the right end portion of the small-diameter portion is formed with a lot of oil holes 7d (only three of them are shown in the figure) radially extending therethrough.

Further, the input shaft 4 has a hub 9 (second rotary body) mounted thereon by spline fitting. The hub 9 is sandwiched from opposite sides by a ring member 14 in abutment with a left-side surface of the right radial ball bearing 5 and the needle roller bearing 6, whereby the hub 9 is restricted such that it can move neither in the leftward direction nor in the rightward direction. Further, the hub 9 has an outer peripheral surface formed with splines 9a along the axis.

Figure 2A:
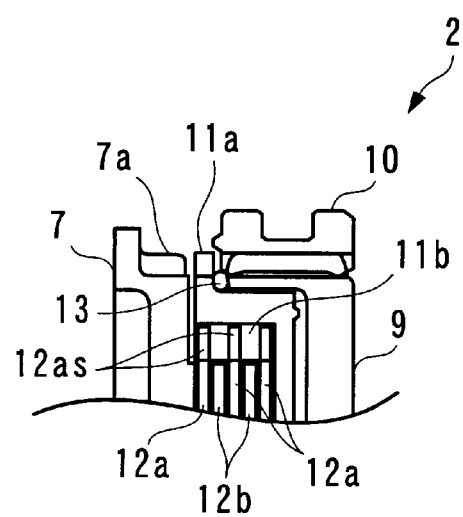
FIG. 2A is a diagram which is useful in explaining an operation carried out by the synchronizing system immediately before the start of synchronization.
Figure 2B:
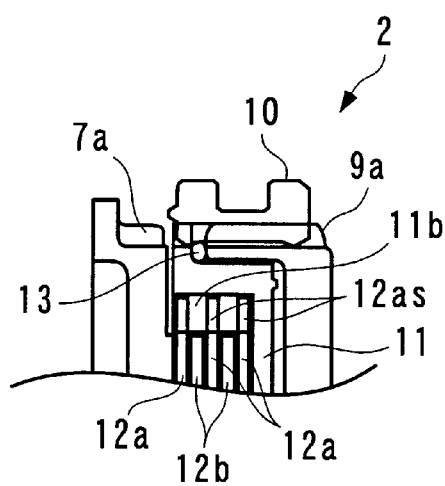
FIG. 2B is a diagram which is useful in explaining an operation carried out by the synchronizing system during the synchronization.
Figure 2C:
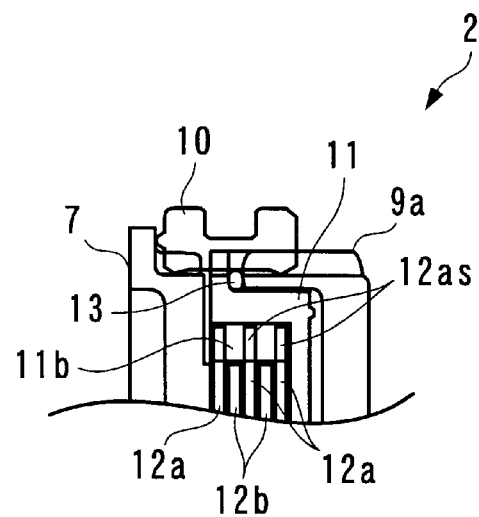
FIG. 2C is a diagram which is useful in explaining an operation carried out by the synchronizing system after the completion of the synchronization.

The synchronizing system 2 is comprised of the sleeve 10 (movable member), a blocking ring 11 (engagement member), a clutch 12, and a synchronizing spring 13 (synchronizing member). The sleeve 10 has an annular shape, and has an inner peripheral surface formed with the splines 10a (see FIG. 1) for meshing with the splines 9a of the hub 9. This makes the sleeve 10 slidable in the leftward and rightward directions with respect to the hub 9. Each spline 10a has a tooth (protruding portion) which has a left end portion thereof, that is, a tooth axial end portion slightly protruding radially inwardly (see FIGS. 2B and 2C), and has two sloped portions formed such that the spline 10a is tapered toward the left end from a portion including the slightly protruding portion (see FIGS. 3A to 3C). Further, the sleeve 10 has an outer peripheral surface formed with a groove 10b along the circumferential direction of the sleeve 10. The groove 10b has an actuation arm, not shown, of an actuator 24 (driving means), referred to hereinafter, fitted therein such that the sleeve 10 is driven (urged) in the leftward and rightward directions by the actuator 24 to be slid leftward and rightward.

Further, the blocking ring 11 is generally in the form of a bottomed hollow cylinder (right end portion corresponding to the bottom portion of the cylinder is formed with an opening through which extends the input shaft 4 and other associated member portions) includes external splines 11a formed in an outer peripheral surface of a left end portion thereof and extending along the axis, and internal splines 11b formed in an inner peripheral surface of the blocking ring 11 and extending along the axis. The splines 10a of the sleeve 10 can be meshed with the external splines 11a. Further, similarly to the spline 7a, each external spline 11a has a tooth (protruding portion) having a right end portion thereof, that is, a tooth axial end portion formed with two sloped portions such that the external spline 11a is tapered in the rightward direction (see FIGS. 3A to 3C). Further, the above-mentioned synchronizing spring 13, which has an annular shape, is fitted in the blocking ring 11, such that it is arranged between the hub 9 and the blocking ring 11 for abutment against them.

Further, the clutch 12 described above is a wet-type multiple disc clutch which has a lot of friction discs 12a, 12b supplied with lubricating oil therebetween. The friction discs 12a, 12b are each formed to have an annular shape, and arranged side by side along the axis alternately and at the same time coaxially between the cylinder bottom-corresponding portion of the blocking ring 11 and the gear member 7. Each friction disc 12a (second friction disc) is formed to have a slightly larger diameter than that of each friction disc 12b (first friction disc), and has an outer peripheral surface thereof formed with splines 12as for being meshed with the internal splines 11b of the blocking ring 11. This enables the friction disc 12a to slide in the leftward and rightward directions and at the same time rotate together with the blocking ring 11. Further, each friction disc 12*b* has an inner peripheral surface formed with splines 12*bs* for being meshed with the splines 7*c* of the gear member 7, which enables each friction disc 12*a* to slide in the leftward and rightward directions and at the same time rotate together with the gear member 7. Further, when the blocking ring 11 is urged leftward, the friction discs 12*a*, 12*b* pressed by the blocking ring 11 are guided by the splines 11*b*, 7*c* to slide leftward, respectively, and the friction disc 12*a* at the left end abuts against the large-diameter portion of the gear member 7, whereby the friction discs 12*a* and the friction discs 12*b* are brought into surface contact with each other.

On the other hand, the input shaft 4 is formed with an oil passage 4*b* extending within the same in the leftward and rightward directions. The oil passage 4*b* opens via a through hole 4*c* in a portion of the input shaft 4 in contact with the needle roller bearing 6 arranged on the outer peripheral surface of the input shaft 4, and is connected to an oil pump, not shown. Lubricating oil fed under pressure from the oil pump passe through the oil passage 4*b*, the through hole 4*c*, the inside of the needle roller bearing 6, a gap between the gear member 7 and the hub 9, and the oil holes 7*d*, to be supplied between the friction discs 12*a*, 12*b* and thereafter discharged through a gap between the gear member 7 and the blocking ring 11 and the like. Thus, the friction discs 12*a*, 12*b* are lubricated for prevention of seizure between them.

Next, an operation carried of the synchronizing system 2 constructed as above will be described with reference to FIGS. 2A to 3C, mainly concerning a synchronization operation for synchronizing the input shaft 4 and the gear member 7 with each other. First, from a state in which the sleeve 10 is not engaged with the blocking ring 11, and the input shaft 4 is rotating, with the gear member 7 being in stoppage, as the sleeve 10 is urged toward the blocking ring 11 by the actuator 24, the sleeve 10 is caused to slide on the hub 9 toward the blocking ring 11 to urge the synchronizing spring 13 leftward by the tooth axial end portions of the splines 10*a* (see FIG. 2A), whereby the blocking ring 11 is urged toward the gear member 7 via the synchronizing spring 13. As a result, the friction discs 12*a* of the clutch 12 are brought into abutment with the friction discs 12*b*, and the blocking ring 11 rotates as the input shaft 4 rotates, whereby frictional forces are generated between the friction disc 12*a* and the friction discs 12*b* to thereby start transmission of torque from the input shaft 4 to the gear member 7.

Then, when the tooth axial end portion of each spline 10*a* climbs over the synchronizing spring 13 (see FIG. 2B), each external spline 11*a* of the blocking ring 11 and the spline 10*a* are placed in a positional relationship in which the axial tooth ends thereof are overlapping each other (see FIG. 3A), and the blocking ring 11 rotates more slowly than the input shaft 4 due to the rotational resistance of the gear member 7. Thus, a sloped portion of the tooth of the spline 10*a* is brought into abutment with a sloped portion of the external spline 11*a* (see FIG. 3B).

In the above state, when the actuator 24 continues to press the sleeve 10 leftward, the blocking ring 11 is urged toward the gear member 7 to transmit torque of the input shaft 4 via the friction discs 12*a*, 12*b*, whereby the gear member 7 and the input shaft 4 are synchronized with each other. After the synchronization between the gear member 7 and the input shaft 4 has been completed, each spline 10*a* moves to a position indicated by a dotted line in FIG. 3B, and then is meshed with the spline 7*a* of the gear member 7 (see FIGS. 2C and 3C). This causes the gear member 7 to be solidly connected with the input shaft 4 via the hub 9 and the sleeve 10 to thereby rotate together with the input shaft 4.

Figure 4:
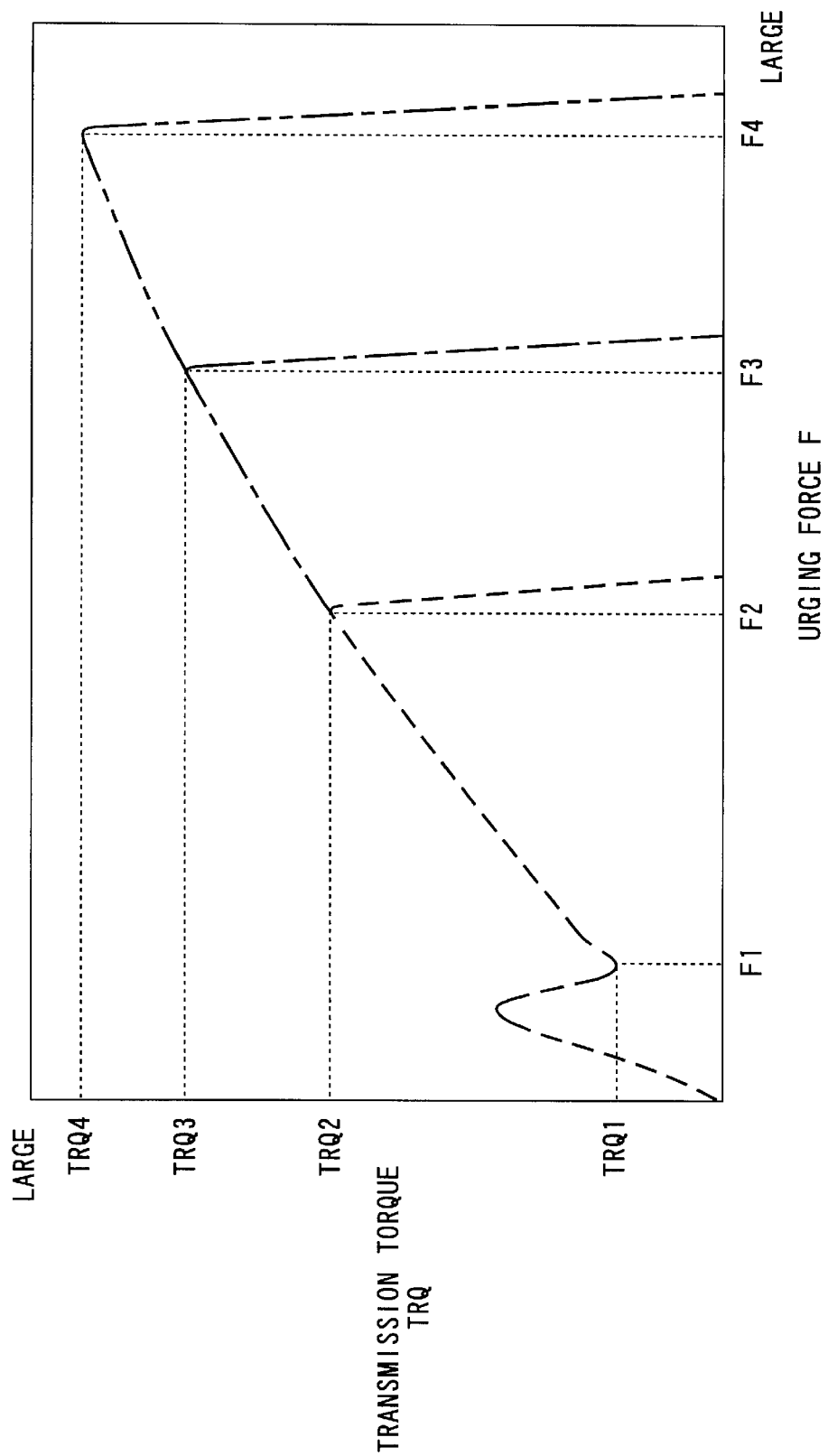
FIG. 4 is a diagrammatic view showing the relationship between an urging force applied to the sleeve and a transmission torque transmitted by the synchronizing system.

FIG. 4 is a diagrammatic view showing an example of the relationship between an urging force F (driving force) with which the actuator 24 presses the sleeve 10 toward the gear member 7, and a transmission torque TRQ which is transmitted from the input shaft 4 to the gear member 7 by the synchronizing system 2. In the figure, a curve represented by a broken line indicates a case in which the difference in torque (torque difference) between the input shaft 4 and the gear member 7 is small, a curve represented by a one dot-chain line indicates a case in which the torque difference between the input shaft 4 and the gear member 7 is larger than the case indicated by the curve of the broken line, and a curve represented by a two dot-chain line indicates a case in which the torque difference is still larger than the case indicated by the curve of the one dot-chain line.

In this figure, an area in which the urging force F is small (area where the urging force F is approximately equal to or smaller than a predetermined value F1) indicates a change which occurs in the above relationship when the tooth end portion of each spline 10*a* of the sleeve 10 climbs over the synchronizing spring 13. Further, in a state in which the tooth end portions of the splines 10*a* are in abutment with the tooth end portions of the external splines 11*a* after the tooth end portions of the splines 10*a* have climbed over the synchronizing spring 13, the transmission torque TRQ becomes larger as the urging force F becomes larger, such that the urging force F and the transmission torque TRQ have a substantially linear relationship with each other. Accordingly, when the tooth end portions of the splines 10*a* and 11*a* are in abutment with each other, it becomes possible to control the transmission torque TRQ by controlling the urging force F of the actuator 24. Further, since the input shaft 4 and the gear member 7 are mechanically connected to each other, the maximum value of the transmission torque TRQ is increased as the torque difference between the input shaft 4 and the gear member 7 is increased (TRQ2<TRQ3<TRQ4). This makes it possible to control the transmission torque TRQ based on the urging force F which is in a predetermined value range (e.g. $F1 \leq F \leq F2$) including the maximum value thereof determined depending on the torque difference. Therefore, if the urging force F of the actuator 24 continues to be controlled until the synchronization between the gear member 7 and the input shaft 4 has been completed, the transmission torque TRQ can be controlled.

Figure 5:
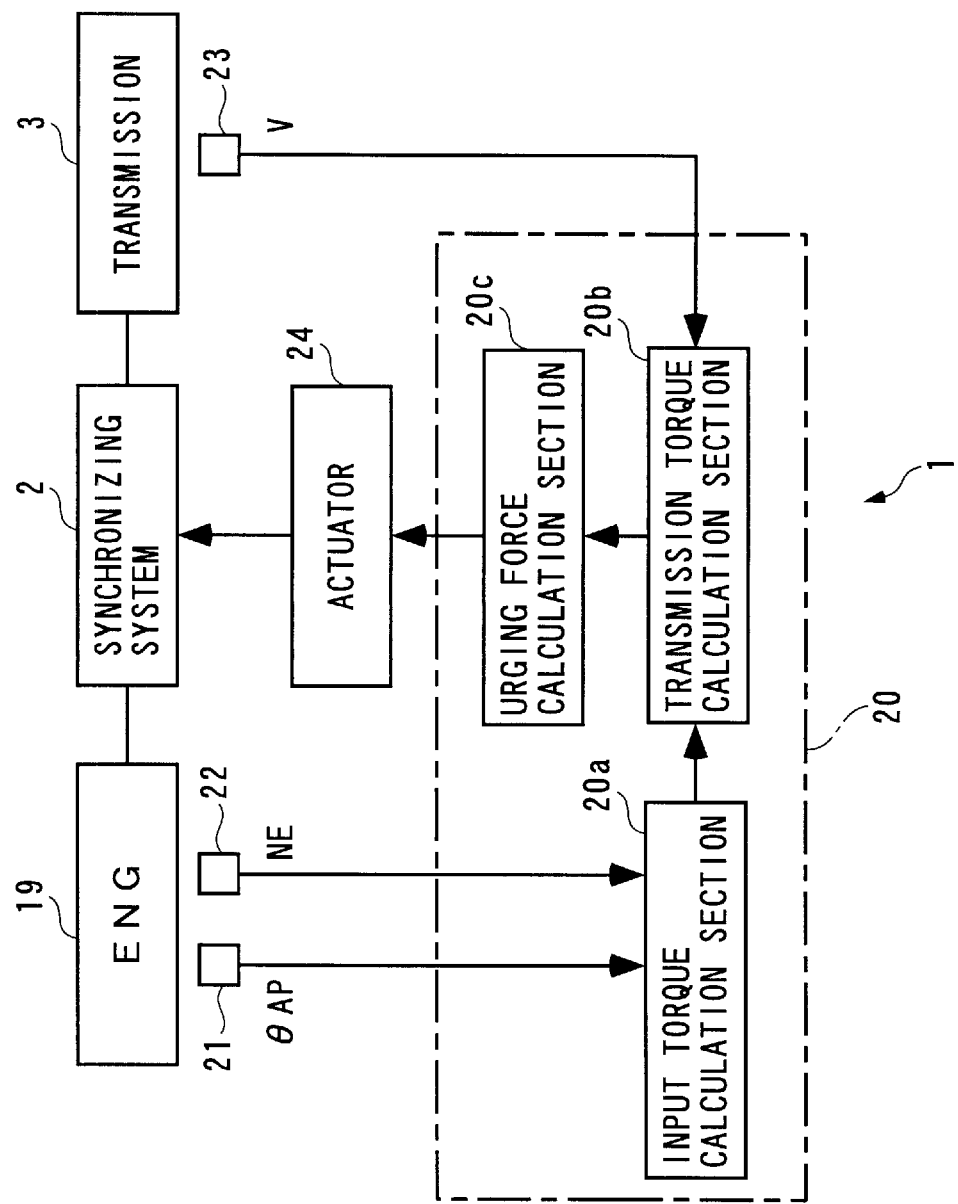
FIG. 5 is a block diagram schematically showing the arrangement of the transmission torque control device.

Next, a transmission torque control device 1 for controlling the transmission torque TRQ of the aboved-mentioned synchronizing system 2 will be described with reference to a block diagram shown in FIG. 5. The transmission torque control device 1 controls the synchronizing system 2, thereby controlling a transmission torque which is transmitted from an engine 19 to the transmission 3 when the automotive vehicle is started.

The transmission torque control device 1 is comprised of an ECU 20, an accelerator opening sensor 21, an engine rotational speed sensor 22, a vehicle speed sensor 23, the actuator 24, and the like. The accelerator opening sensor 21 (torque detection means) is arranged at a location close to an accelerator pedal, not shown, of the engine 19, for sensing an opening degree θAP of the accelerator pedal (hereinafter referred to as "the accelerator opening θAP") to supply a signal indicative of the sensed accelerator opening θAP to the ECU 20. Further, the engine rotational speed sensor 22 (torque detection means) senses a rotational speed NE of the engine 19 (hereinafter referred to as "the engine rotational speed NE") and supplies a signal indicative of the sensed engine rotational speed NE to the ECU 20.

The vehicle speed sensor 23 is arranged in the transmission 3, for sensing a rotational speed, which corresponds to a vehicle speed V, of a rotary shaft, not shown, of the transmission 3, to supply a signal indicative of the sensed rotational speed of the rotary shaft to the ECU 20. The ECU 20 calculates the vehicle speed V based on the supplied signal.

Further, the actuator 24 is mechanically connected to the sleeve 10 of the synchronizing system 2 and electrically connected to the ECU 20. The actuator 24 has its operation controlled by a drive signal delivered from the ECU 20, such that it urges the sleeve 10 of the synchronizing system 2 toward the blocking ring 11 or in an opposite direction thereto with the urging force F dependent on the drive signal.

The ECU 20 (torque detection means, driving force setting means) is formed by a microcomputer including a RAM, a ROM, a CPU, an I/O interface, none of which are shown. The ECU 20 controls the transmission torque transmitted from the engine 19 to the transmission 3 via the synchronizing system 2, as described hereinafter, based on the signals delivered from the above sensors 21 to 23. It should be noted that an input torque calculation section 20a (torque detection means), a transmission torque calculation section 20b, and an urging force calculation section 20c (driving force setting means), all of which are referred to hereinafter, are implemented by the ECU 20.

More specifically, first, an input torque delivered from the engine 19 to the synchronizing system 2 is calculated by the input torque calculation section 20a based on the accelerator opening θAP and the engine rotational speed NE. The input torque is calculated e.g. by searching a map. Next, a transmission torque TRQ to be transmitted to the transmission 3 by the synchronizing system 2 is calculated based on the calculated input torque and the vehicle speed V by the transmission torque calculation section 20b. Similarly to the input torque, this transmission torque TRQ as well is calculated e.g. by searching a map.

Next, the urging force calculation section 20c calculates the urging force F of the actuator 24 based on the calculated transmission torque TRQ by searching a table set based on the relationship between the urging force F and the transmission torque TRQ, described above with reference to FIG. 4. Then, a drive signal generated based on the urging force F is output to the actuator 24, whereby the calculated transmission torque TRQ is transmitted to the transmission 3 via the synchronizing system 2.

As described hereinbefore, according to the transmission torque control device 1 of the present embodiment, the synchronizing system 2 can be controlled such that the transmission torque TRQ calculated based on the input torque from the engine 19 and the vehicle speed V is transmitted to the transmission 3 when the automotive vehicle is started. This makes it possible to obtain an appropriate starting torque to smoothly start the automotive vehicle.

Although the transmission torque control device 1 according to the present embodiment is configured such that the transmission torque TRQ is controlled based on the input torque, this is not limitative, but the transmission torque control device 1 may be constructed such that the transmission torque TRQ is controlled based on the difference between the input torque and the output torque, or based on the output torque. Further, the configuration for connecting the gear member 7 to the input shaft 4 while positioning the sleeve 10 of the synchronizing system 2 with respect to the blocking ring 11 is not limited to one using the synchronizing spring 13 according to the embodiment, but any suitable device may be utilized so long as it has the same function as that of the synchronizing spring 13. For instance, a synchronizer key may be employed. Further, although in the present embodiment, the synchronizing system 2 according to the invention is applied to the transmission for an automotive vehicle, this is not limitative, but the same can be applied to various uses. For instance, it may be used as a clutch in a transmission for an automotive vehicle which does not have a torque converter, and controlled such that a small amount of a transmission torque TRQ is always generated during transmission. This makes it possible, similarly to an automatic transmission provided with a torque converter, to prevent torque from becoming dull. Further, the transmission torque control device 1 as well is not limited to the device according to the present embodiment which controls torque transmitted from the engine 19 to the transmission 3, but it may be applied to various uses. For instance, it may be applied to an automotive vehicle of a type which drives wheels by an electric motor, and configured such that the synchronizing system 2 is arranged between the electric motor and a differential gear to control transmission torque transmitted from the electric motor to the differential gear.

It is further understood by those skilled in the art that the foregoing is a preferred embodiment of the invention, and that various changes and modifications may be made without departing from the spirit and scope thereof.

What is claimed is:

1. A synchronizing system for connecting a first rotary body and a second rotary body arranged in a manner spaced from each other and at the same time relatively rotatable about an identical axis, while synchronizing the first rotary body and the second rotary body with each other, so as to transmit torque between the first rotary body and the second rotary body, the synchronizing system comprising:

an engagement member which is arranged between the first rotary body and the second rotary body in a manner such that said engagement member is capable of moving along the axis and rotating about the axis relatively with respect to each of the first rotary body and the second rotary body;

at least one first friction disc rotating together with the first rotary body;

at least one second friction disc each arranged in a manner opposed to and spaced from said at least one first friction disc, said at least one second friction disc rotating together with said engagement member, and being brought into surface contact with said at least one first friction disc when said engagement member is urged toward the first rotary body, thereby synchronizing said engagement member and the first rotary body with each other;

a movable member which rotates together with the second rotary body and is capable of moving along the axis with respect to the second rotary body such that said movable member can move to a disconnected position in which said movable member is spaced from said engagement member, a synchronizing position in which said movable member is capable of abutting against said engagement member from an opposite side to the first rotary body, and a connected position in which said movable member is engaged with the first rotary body; and a synchronizing member which, when said movable member moves from the disconnected position to the synchronizing position, is driven by said movable member to thereby urge said engagement member toward the first rotary body, whereby said synchronizing member starts to synchronize the first rotary body and the second rotary body via said at least one first friction disc and said at least one second friction disc and causes said engagement member to abut against said movable member located in the synchronizing position.

2. A synchronizing system according to claim 1, wherein said second rotary body comprises a drive shaft, and a hub rotating together with said drive shaft.

3. A synchronizing system according to claim 2, wherein the first rotary body has first splines formed in an outer peripheral surface thereof, said engagement member having second splines formed in an outer peripheral surface thereof, said hub having third splines formed in an outer peripheral surface thereof, said movable member having fourth splines formed in an inner peripheral surface thereof for being in engagement with the third splines of said hub, and wherein the fourth splines of said movable member are in abutment with the second splines of said engagement member when said movable member is in the synchronizing position, and in engagement with the second splines of said engagement member and the first splines of said first rotary body when said movable member is the connected position.

4. A synchronizing system according to claim 3, wherein the first rotary body has a large-diameter portion and a small-diameter portion, the first splines of the first rotary body being formed in an outer peripheral surface of the large-diameter portion, the small-diameter portion having fifth splines formed in an outer peripheral surface thereof, said at least one first friction disc each having sixth splines formed in an inner peripheral surface thereof, and wherein the fifth splines of the small-diameter portion of the first rotary disc are in engagement with the sixth splines of said at least one first friction disc.

5. A synchronizing system according to claim 4, wherein said engagement member has seventh splines formed in an inner peripheral surface thereof, said at least one second friction disc each having eighth splines formed in an outer peripheral surface thereof, and wherein the seventh splines of said engagement member are in engagement with the eighth splines of said at least one second friction disc.

6. A transmission torque control device for a synchronizing system for connecting a first rotary body and a second rotary body arranged in a manner spaced from each other and at the same time relatively rotatable about an identical axis, while synchronizing the first rotary body and the second rotary body with each other, so as to transmit torque between the first rotary body and the second rotary body, the synchronizing system including an engagement member which is arranged between the first rotary body and the second rotary body in a manner such that the engagement member is capable of moving along the axis and rotating about the axis relatively with respect to each of the first rotary body and the second rotary body, at least one first friction disc rotating together with the first rotary body, at least one second friction disc each arranged in a manner opposed to and spaced from the at least one first friction disc, the at least one second friction disc rotating together with the engagement member, and being brought into surface contact with the at least one first friction disc when the engagement member is urged toward the first rotary body, thereby synchronizing the engagement member and the first rotary body with each other, a movable member which rotates together with the second rotary body and is capable of moving along the axis with respect to the second rotary body such that the movable member can move to a disconnected position in which the movable member is spaced from the engagement member, a synchronizing position in which the movable member is capable of abutting against the engagement member from an opposite side to the first rotary body, and a connected position in which the movable member is engaged with the first rotary body, and a synchronizing member which, when the movable member moves from the disconnected position to the synchronizing position, is driven by the movable member to thereby urge the engagement member toward the first rotary body, whereby the synchronizing member starts to synchronize the first rotary body and the second rotary body via the at least one first friction disc and the at least one second friction disc and causes the engagement member to abut against the movable member located in the synchronizing position, wherein the transmission torque control device controls the torque transmitted between the first rotary body and the second rotary body, the transmission torque control device comprising:

driving means for driving the movable member along the axis;

torque detection means for detecting torque of at least one of the first rotary body and the second rotary body; and driving force setting means for setting a driving force of said driving means applied when the movable member is in abutment with the engagement member, based on the detected torque.

* * * * *